US005638124A

United States Patent [19]
Soda et al.

[11] Patent Number: 5,638,124
[45] Date of Patent: Jun. 10, 1997

[54] VIDEO SIGNAL PROCESSING APPARATUS HAVING AN IMAGE INSERTING AND EXTRACTING CIRCUIT FOR INSERTING AN IMAGE INTO OR EXTRACTING AN IMAGE FROM VIDEO SIGNAL BASED ON A DETECTED RESULT OF A MOTION DETECTING CIRCUIT

[75] Inventors: Atsumu Soda, Tokyo; Takayuki Takeda, Kanagawa, both of Japan

[73] Assignee: Sony Corporation, Tokyo, Japan

[21] Appl. No.: 410,895

[22] Filed: Mar. 27, 1995

[30] Foreign Application Priority Data

Mar. 29, 1994 [JP] Japan .................. 6-059103
Mar. 17, 1995 [JP] Japan .................. 7-059216

[51] Int. Cl.$^6$ .............. H04N 7/12; H04N 11/02; H04N 11/04; H04N 5/76
[52] U.S. Cl. .............. 348/402; 348/700; 386/46; 386/113
[58] Field of Search .............. 348/699, 700, 348/701, 416, 415, 409, 390, 384, 402; 358/335, 310; 360/33.1, 9.1, 10.3; H04N 7/12, 11/02, 11/04, 5/76

[56] References Cited

U.S. PATENT DOCUMENTS 5,475,502  12/1995  Lee et al. .................. 358/433
5,493,345   2/1996  Ishikawa et al. .......... 348/700
5,537,147   7/1996  Tahara ........................ 348/400

*Primary Examiner*—Thai Q. Tran
*Assistant Examiner*—Aung S. Moe
*Attorney, Agent, or Firm*—William S. Frommer; Alvin Sinderbrand

[57] ABSTRACT

A video signal processing apparatus includes a discrete cosine transform circuit for generating a DC component and an AC component by processing image data in a discrete cosine transform fashion, a motion detecting circuit for generating a coincidence detection level based on an energy ratio between the DC component and the AC component generated by the discrete cosine transform circuit, comparing a difference between a DC component of a first field or frame and a DC component of a second field or frame continuing the first field or frame of the image data with the coincidence detection level and detecting on the basis of a compared result whether the image data indicates a moving picture or a still picture, and an image inserting and extracting circuit for inserting an image into or extracting an image from image data at field or frame unit based on a detected result of the motion detecting circuit, wherein the image inserting and extracting circuit inserts an image into or extracts an image from image data at the field unit when the motion detecting circuit detects that the image data indicates a moving picture and inserts an image into or extracts an image from image data at the frame unit when the motion detecting circuit detects that the image data indicates a still picture.

5 Claims, 5 Drawing Sheets

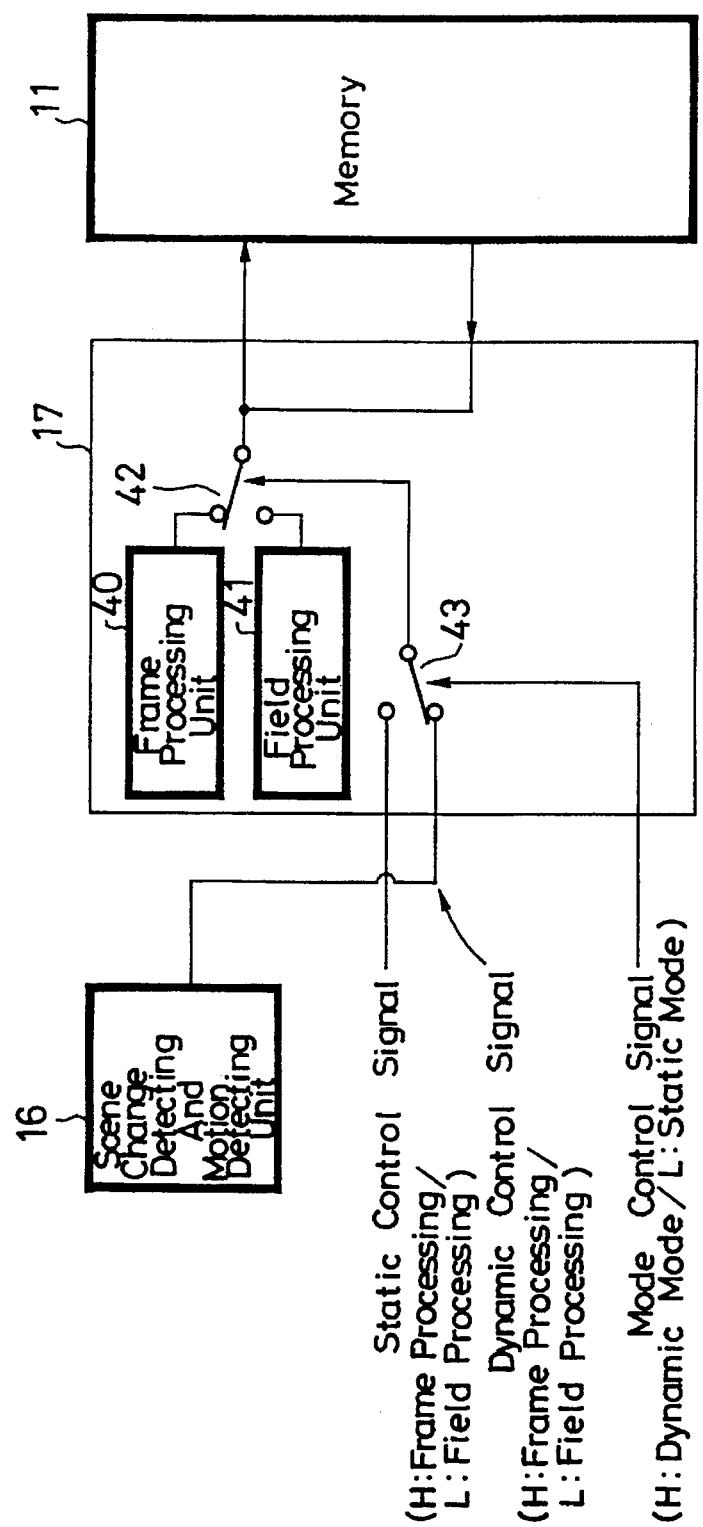

VIDEO SIGNAL PROCESSING APPARATUS HAVING AN IMAGE INSERTING AND EXTRACTING CIRCUIT FOR INSERTING AN IMAGE INTO OR EXTRACTING AN IMAGE FROM VIDEO SIGNAL BASED ON A DETECTED RESULT OF A MOTION DETECTING CIRCUIT

BACKGROUND OF THE INVENTION

The present invention relates to video signal processing apparatus and, more particularly to a video signal processing apparatus in which insertion or extraction of image data at the field or frame unit is switched by detecting a motion amount of an image based on an energy ratio between a DC video signal component and an AC video signal component.

When a VCR (video cassette recorder) is used in a so-called program play in which a video signal recorded on a magnetic tape is reproduced under the condition that an overall reproducing speed is changed by changing a tape running speed in a range of from ten and several percents for pluses and minuses relative to a tape running speed of a normal reproduction mode, there has hitherto been proposed a video signal processing technique in which the magnetic tape on which the video signal is recorded is reproduced by a playback head and image is inserted into or extracted from a reproduced video signal. According to this video signal processing technique, image is inserted into or extracted from the reproduced video signal by a so-called frame synchronizer used in some suitable cases, such as when a PAL video signal is converted to an NTSC video signal.

In the video signal processing apparatus using such video signal processing technique, the frame synchronizer is composed of a memory and a memory controller and image is inserted into and extracted from image data by varying write data and read data of the memory. In this case, image is inserted into and extracted from image data only at the field unit. The reason that image is inserted into and extracted from image data only at the field unit is that, if image is inserted into and extracted from image data at the frame unit, when an image is a moving picture, image data is coarsely inserted into and extracted from image data at the frame unit and a motion on the image becomes rough. Thus, a motion of image becomes unnatural when visually confirmed by the viewer. Therefore, each time image is inserted into and extracted from image data, odd field and even field are not kept continuous.

If odd fields are continued or even fields are continued with the result that odd field and even field are not kept continuous as described above, there then occurs the flicker that a picture is shifted in the upper and lower direction.

To remove the flicker in which the picture is shifted in the upper and lower direction, there has been so far used a technique called "Y/C Add" using a correlation of a television signal in the time axis direction. When however such technique is used, it is frequently observed that a resolution of a reproduced picture is deteriorated considerably. The resolution of the reproduced picture is considerably deteriorated in the lines extending in the oblique direction on the picture.

As described above, since image is inserted into and extracted from image data at the field unit in the video signal processing apparatus, each time image is inserted into and extracted from image data, odd field and even field cannot be kept continuous and hence a quality of a reproduced picture is deteriorated considerably.

SUMMARY OF THE INVENTION

In view of the aforesaid aspect, it is an object of the present invention to provide a video signal processing apparatus in which image is inserted into or extracted from image data under the condition that a motion of a moving picture can be prevented from becoming unnatural to a minimum and that a deterioration of an image can be suppressed to a minimum.

According to an aspect of the present invention, there is provided a video signal processing apparatus which is comprised of a discrete cosine transform means for generating a DC component and an AC component by processing image data in a discrete cosine transform fashion, a motion detecting means for generating a coincidence detection level based on an energy ratio between the DC component and the AC component generated by the discrete cosine transform means, comparing a difference between a DC component of a first field or frame and a DC component of a second field or frame continuing the first field or frame of the image data with the coincidence detection level and detecting on the basis of a compared result whether the image data indicates a moving picture or a still picture, and an image inserting and extracting means for inserting an image into or extracting an image from image data at field or frame unit based on a detected result of the motion detecting means, wherein the image inserting and extracting means inserts an image into or extracts an image from image data at the field unit when the motion detecting means detects that the image data indicates a moving picture and inserts an image into or extracts an image from image data at the frame unit when the motion detecting means detects that the image data indicates a still picture.

BRIEF DESCRIPTION OF THE DRAWINGS

FIG. 5 is a block diagram showing a memory control circuit shown in FIG. 1 in detail.

DETAILED DESCRIPTION OF THE PREFERRED EMBODIMENT

The present invention will now be described below with reference to the drawings.

Figure 1:
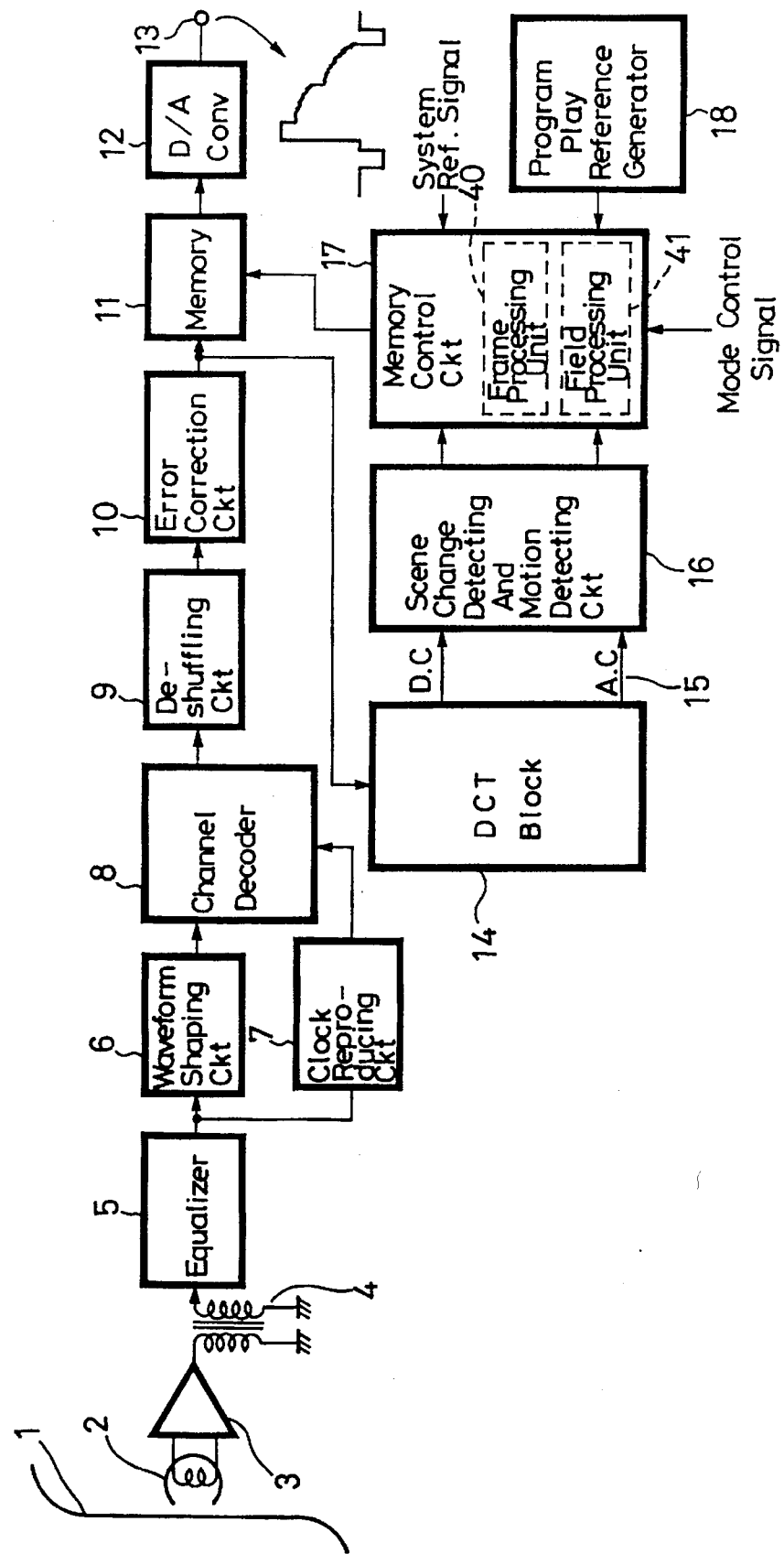
FIG. 1 is a block diagram showing an overall arrangement of a video signal processing apparatus according to an embodiment of the present invention.

FIG. 1 of the accompanying drawings shows in block form an overall arrangement of an image processing apparatus according to an embodiment of the present invention. In this embodiment, a program play is carried out by a digital video signal reproducing apparatus. As earlier noted, according to the program play, a video or audio signal recorded on a magnetic tape is reproduced under the condition that a whole reproducing speed is varied by varying a tape running speed in a range of from ten and several percents for pluses and minuses with respect to a tape running speed of the normal reproducing mode.

As shown in FIG. 1, video signal data recorded on a magnetic tape 1 is reproduced by a reproducing head 2, amplified with a predetermined amplification factor by a head amplifier 3 and then supplied to a rotary transformer 4.

The video signal data supplied to the rotary transformer 4 is supplied to an equalizer 5, in which a noise component is eliminated and an inter symbol interference is eliminated. The video signal data thus processed by the equalizer 5 is supplied to a waveform shaping circuit 6 and a clock reproducing circuit 7. A channel coding decoder 8 judges "1" and "0" by using data waveform-shaped by the waveform shaping circuit 6 and a clock reproduced by the clock reproducing circuit 7.

This channel decoder 8 uses an $M^2$ (Miller squared) code, for example. A rule in this case will be described below. "1" indicates the change of data at the center of bit and "0" indicates the change of data at the boundary of bits. Data is not changed with respect to "0" disposed immediately after "1". The data that had been decoded by the channel decoder 8 is de-shuffled by a de-shuffling circuit 9 and then error-corrected by a Reed-Solomon product code in an error correction circuit 10. The data that had been error-corrected by the error correction circuit 10 is supplied through a memory 11 to a digital-to-analog (D/A) converter 12, in which it is converted to an analog video signal. Then, the analog video signal from the D/A converter 12 is output through a terminal 13.

At a tape running speed in the normal playback mode, data is written in and read out from the memory 11 under the control of a VCR system reference signal supplied to a memory control circuit 17 such that a signal is processed in each stage at a clock rate locked to the VCR system reference signal.

On the other hand, at a tape running speed of the program play, rotational speeds of a drum and a capstan of a tape transport system (not shown) are varied in a range of from ten and several percents for pluses and minuses from the normal rotational speeds based on a program play reference signal supplied from a program play reference generator 18.

Accordingly, the clock rate and the data rate from the reproducing head 2 to the error correction circuit 10 are changed as compared with those of the normal reproducing mode. However, a data rate of the video signal output from the terminal 13 is previously determined by the standards. Accordingly, the clock rate and the data rate have to be varied before a reproduced video signal is output.

In this case, in order to vary the data rate, the memory 11 and the memory control circuit 17 have to function as a so-called frame synchronizer in which image is inserted into or extracted from the image data by varying a data write timing and a data read timing at the field or frame unit.

Operation for extracting image from image data at the field unit and at the frame unit will be described below.

Let it now be considered that, at the tape running speed in the program play, the rotational speeds of the drum and the capstan of the tape transport system (not shown) are increased by 10 percents from the normal rotational speeds. In this case, an amount of information reproduced from the magnetic tape per second is data of 55 fields according to the PAL system and data of about 66 fields according to the NTSC system. The number of fields output in actual practice according to the PAL system becomes 50 fields and the number of fields output in actual practice according to the NTSC system is about 60 fields.

Figure 2:
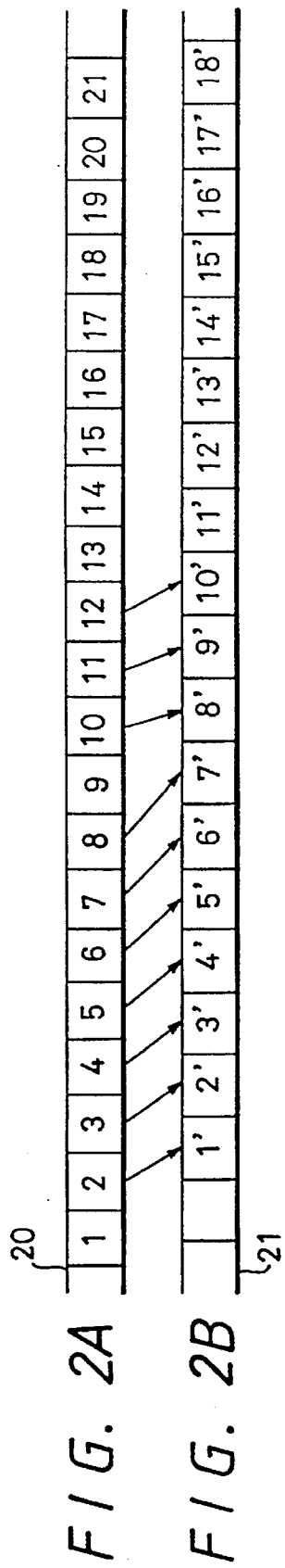
FIGS. 2A and 2B are schematic diagrams used to explain operation for extracting data at the field unit.

Operation for extracting image at the field unit will be described with reference to FIGS. 2A and 2B. FIG. 2A shows a flow of memory write data 20 input to the memory 11 and each field is numbered sequentially. FIG. 2B shows a flow of memory read data 21 output from the memory 11 and each field is numbered sequentially. Each arrow in FIGS. 2A and 2B indicates a correspondence relationship between the field of the memory write data 20 and the field of the memory read data 21. For example, field "2" of the memory write data 20 is output from the memory 11 as the field "1'" of the memory read data 21.

Since data of 1 field has to be extracted at every 11 fields, if the field "9" of the memory write data 20 is extracted, then even field and odd field are not kept continuous between the field "7'" and the field "8'" of the memory read data 21, causing a flicker to take place in the reproduced picture and a resolution of a reproduced picture to be deteriorated.

To extract the data of 1 field at every 11 fields is equivalent to extracting data of 2 fields (=1 frame) at every 22 fields. Accordingly, if data of 2 fields is extracted at every 22 fields, then when odd field and even field of 2 fields are extracted from "odd field, even field, odd field and even field", there can be obtained odd field and even field and the odd field and the even field can be kept continuous.

Figure 3:
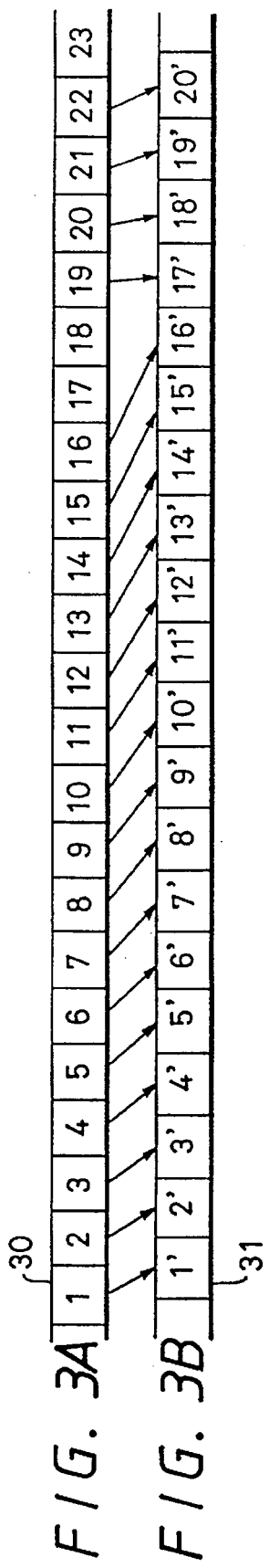
FIG. 3A and 3B are schematic diagrams used to explain operation for extracting data at the frame unit.

Operation for extracting image at the frame unit will be described with reference to FIGS. 3A and 3B. FIG. 3A shows a flow of memory write data 30 input to the memory 11 and each field is numbered sequentially. FIG. 3B shows a flow of memory read data 31 output from the memory 11 and each field is numbered sequentially. Each arrow in FIGS. 3A and 3B indicates a correspondence relationship between the field of the memory write data 30 and the field of the memory read data 31. For example, the field "1" of the memory write data 30 is output from the memory 11 as the field "1'" of the memory read data 31.

As shown in FIGS. 3A and 3B, if the field "17" and the field "18" of the memory write data 30 are extracted, then even field and odd field can be made continuous between the field "16'" and the field "17'" of the memory read data 31. Therefore, no flicker occurs and a resolution of a reproduced picture can be prevented from being deteriorated.

As described above, if a frame processing unit 40 and a field processing unit 41 disposed in the memory control circuit 17 are controlled such that image can be extracted from or inserted into image data not only at the field unit but also at the frame unit by writing image data in and reading image data out from the memory 11, then it is possible to prevent a flicker from taking place in the reproduced picture and also to prevent the resolution of the reproduced picture from being deteriorated.

When however image is inserted into and extracted from image data at the frame unit as shown in FIGS. 3A and 3B, image information of continuous 2 fields of the field "17" and the field "18", i.e., image information of one frame of the memory write data 30 is dropped and a resulting picture becomes considerably unnatural from a visual standpoint.

Therefore, according to this embodiment, the processing for inserting and extracting image at the field unit and the processing for inserting and extracting an image at the frame unit are switched in response to a motion amount of an image. Specifically, if an image has a large amount of motion, then the processing for inserting and extracting image at the field unit is carried out to prevent a motion of a moving image from becoming unnatural due to insertion and extraction of image. If an image has a scene change and an image is a still picture having little amount of motion, then when image is inserted into and extracted from image data at the frame unit, a motion of the image does not become unnatural. Therefore, image is inserted into and extracted from the image data at the frame unit and even field and odd field can be kept continuous.

Specifically, referring back to FIG. 1, the data that had been error-corrected by the error correction circuit 10 is processed by a discrete cosine transform (DCT) block 14 in a DCT fashion to provide DC component data (D.C) and AC component data (A.C) 15. The DC component data (D.C) and the AC component data (A.C) 15 are supplied to a scene change detecting and motion detecting circuit 16.

The scene change detecting and motion detecting circuit 16 detects on the basis of the DC component data and the AC component data input thereto whether an image has a scene change or whether an image is a moving picture or a still picture. Then, the memory control circuit 17 performs a control operation corresponding to a detected result supplied thereto from the scene change detecting and motion detecting circuit 16.

The memory control circuit 17 controls the memory 11 by switching the image insertion and extraction frame processing unit 40 and the image insertion and extraction field processing unit 41 on the basis of the detected result input thereto from the scene change detecting and motion detecting circuit 16. Specifically, the memory control circuit 17 selects the field processing unit 41 when the input detected result indicates that an image is a moving picture and selects the frame processing unit 40 when the detected result indicates that an image has a scene change or that an image is a still picture.

A specific arrangement of the scene change detecting and motion detecting circuit 16 and scene change detecting operation and motion detecting operation of this circuit 16 will be described below in detail with reference to FIG. 4.

Figure 4:
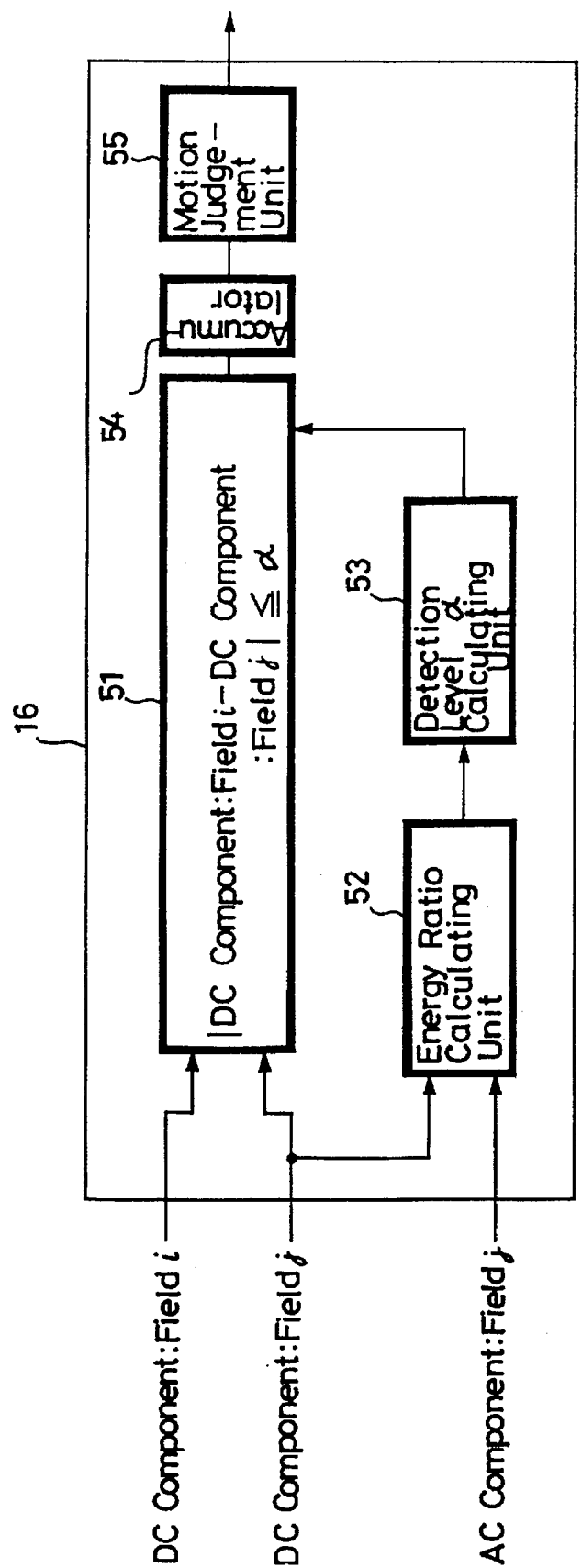
FIG. 4 is a block diagram showing a specific arrangement of the scene change detecting and motion detecting circuit shown in FIG. 1.

As shown in FIG. 4, the scene change detecting and motion detecting circuit 16 is composed of a coincidence judgement unit 51, an energy ratio calculating unit 52, a detection level α calculating unit 53, an accumulator 54 and a motion judgement unit 55. The coincidence judgement unit 51 is supplied with DC components of a plurality of macroblocks constructing a filed i of an image signal and DC components of a plurality of macroblocks constructing a field j continuing to the field i with a distance of one frame from the DCT block 14. The coincidence judgement unit 51 calculates a difference between high order 8 bits of the DC component of macroblocks constructing the field i and high order 8 bits of the DC component of corresponding macroblocks constructing the field j and judges whether or not an absolute value of this difference is smaller than a detection level α with respect to all macroblocks constructing one field. The coincidence judgement unit 51 determines, when the absolute value of this difference is smaller than the detection level α, that the macroblocks of the field i are coincident with the corresponding macroblocks of the field j and supplies a coincidence signal to the accumulator 54. The accumulator 54 accumulates coincidence signals of macroblocks constructing one field from the coincidence judgement unit 51 and supplies an accumulated value to a motion judgement unit 55. The motion judgement unit 55 detects on the basis of the accumulated value supplied thereto from the accumulator 54 whether an image is a moving picture or whether an image has a scene change or an image is a still picture.

Operation of the motion judgement unit 55 will be described mode fully below.

The NTSC video signal has 11520 macroblocks constructing one filed and the PAL video signal has 13680 macroblocks constructing one field. If the number of macroblocks accumulated by one field amount by the accumulator 54 after the coincidence judgement unit 51 had judged that the macroblocks are coincident is 97.2% of the total number of macroblocks within one field or greater, i.e., if the NTSC video signal has 11198 macroblocks or greater and the PAL video signal has 13297 macroblocks or greater, then the motion judgement unit 55 judges that the image is a still picture. If the number of macroblocks accumulated by the accumulator 54 is less than 5000, then the motion judgement unit 55 judges that the image has a scene change. If the number of macroblocks accumulated by the accumulator 54 lies in a range of from 5000 to 11198 or 13297, then the motion judgement unit 55 judges that an image is a moving picture. Then, if the motion judgement unit 55 judges that the image is the moving picture, then the motion judgement unit 55 outputs a low level signal. If on the other hand the motion judgement unit 55 judges that the image is the still picture or that the image has a scene change, then the motion judgement unit 55 outputs a high level signal.

The detection level α used by the coincidence judging unit 51 to judge a coincidence of macroblocks is calculated by the detection level α calculating unit 53 on the basis of an energy ratio between the DC component and the AC component calculated by the energy ratio calculating unit 52.

The energy ratio calculating unit 52 calculates an energy ratio between the DC component and the AC component of the field j of the image signal supplied thereto from the DCT block 14. If an image has a relatively simple picture pattern, then an energy of DC component of image data becomes relatively large. If on the other hand an image has a relatively complex picture pattern, then an energy of DC component of image data becomes relatively small. Therefore, the DCT block 14 increases the number of bits assigned to the DC component when the energy of DC component is relatively large, and decreases the number of bits assigned to the DC component when the energy of DC component is relatively small. According to this embodiment, the DCT block 14 changes the number of bits assigned to the DC component in a range of from 10 bits to 14 bits in accordance with a magnitude of DC component, i.e., simplicity of picture pattern of image. Therefore, according to this embodiment, it is possible to simply calculate the energy ratio (ratio between DC component value and AC component value) of DC component and AC component of image data supplied from the DCT block 14 or it is possible to detect the number of bits assigned to the DC component. The detection level α calculating unit 53 calculates the detection level α based on a detected result of the energy ratio calculating unit 52.

Operation for detecting the number of bits assigned to the DC component by the energy ratio calculating unit 52 will be described below.

The detection level α calculating unit 53 sets the detection level α to "2" when the number of bits assigned to the DC component is 10 bits. The detection level α calculating unit 53 sets the detection level α to "3" when the number of bits assigned to the DC component is 11 bits. calculating unit 52. The detection level α calculating unit 53 sets the detection level α to "3" when the number of bits assigned to the DC component is 12 bits. The detection level α calculating unit 53 sets the detection level α to "4" when the number of bits assigned to the DC component is 13 bits. Further, the detection level α calculating unit 53 sets the detection level α to "4" when the number of bits assigned to the DC component is 14 bits.

In other words, a macroblock coincidence detection standard becomes strict for an image of complex picture pattern and becomes lenient for an image of simple picture pattern. The reason for this will be described below. A high frequency component of image data is difficult to be recognized visually and a low frequency component of image data becomes significant. Conversely, a motion of an image composed of much low frequency components and less high frequency component, i.e., image of simple picture pattern is difficult to be recognized visually. Further, a motion of an image composed of less low frequency component and much high frequency components, i.e., image of complex picture pattern becomes easy to be recognized visually. In other words, an image of a simple picture pattern can be recognized roughly and an image of a complex picture pattern can be recognized in detail. This characteristic can be obtained from experience and the value of the above-mentioned detection level $\alpha$ also can be obtained from experience.

Since the detection level which becomes the standard to detect a coincidence between the macroblocks is changed on the basis of an energy ratio between the DC component and the AC component, an image of a simple picture pattern whose motion is difficult to be recognized visually can be detected as a still picture from a very small motion. To the contrary, an image of a complex picture pattern whose motion is easy to be recognized visually can be detected as a moving picture from a very small motion. Therefore, it is possible to detect a motion of a picture without a feeling of physical disorder from a visual standpoint.

While the DCT block 14 which processes the output of the error correction circuit 10 in a DCT fashion is provided in order to obtain the DC component of the image signal as described above, if data recorded on the magnetic tape 1 is already processed in a DCT fashion, then the DCT block 14 need not be provided. Recently, it is known that image data that had been processed in a DCT fashion is compressed by a variable length coding and compressed data is recorded on a recording medium. In such case, data indicative of the number of bits assigned to the DC component used in DCT is recorded on the recording medium and the energy ratio calculating unit 52 may detect the data indicating the number of bits assigned to the DC component. When however the data that had been processed in a DCT fashion is recorded on the magnetic tape 1 as described above, it becomes of course necessary to provide an inverse discrete cosine transform (IDCT) circuit which can process the output of the memory 11 in an IDCT fashion.

While the scene change detecting and motion detecting circuit 16 detects a motion of an image at the field unit as described above, the present invention is not limited thereto and the scene change detecting and motion detecting circuit 16 may detect a motion of an image at the frame unit.

However, it is frequently observed that a continuity between the even field and the odd field is regarded as very important regardless of a motion of an image depending on the use of image data output from the terminal 13 or operator's preference. Conversely, it is frequently observed that a smoothness of a motion of an image is regarded as very important. Therefore, according to this embodiment, there is provided a mode in which the image insertion and extraction processing is fixed to either the field processing or the frame processing a regardless of a motion of an image, i.e., so-called static control mode. Also, there is provided a mode in which the field processing and the frame processing are properly switched when necessary, i.e., so-called dynamic control mode. The static control mode and the dynamic control mode can be switched by the operator.

Operation for switching the dynamic control mode and the static control mode will be described with reference to FIG. 5.

As shown in FIG. 5, the memory control circuit 17 includes the frame processing unit 40, the field processing unit 41 and switches 42 and 43. When the operator depresses a button disposed on a control panel (not shown) of the video signal processing apparatus, a high "H" or low "L" level signal is supplied to the switch 43 as a mode control signal. When the mode control signal is at high "H" level, the mode is switched to the dynamic control mode by the switch 43. When on the other hand the mode control signal is at low "L" level, the mode is switched to the static control mode by the switch 43.

When the operator depresses a button disposed on the control panel (not shown) of the video signal processing apparatus, a high or low level signal is supplied to a contact shown on the upper stage of the switch 43. This signal is a static control signal enabling the memory control circuit 17 to carry out either the frame processing or the field processing in a static control mode fashion. When this static control signal is at high "H" level, the memory control circuit 17 carries out the frame processing. When on the other hand this static control signal is at low "L" level, the memory control circuit 17 carries out the field processing.

The switch 43 is supplied at its contact shown on the lower stage with the high "H" or low "L" level signal from the scene change detecting and motion detecting circuit 16. This signal is a dynamic control signal which enables the memory control circuit 17 to carry out a dynamic signal processing at the frame unit or the field unit. When this dynamic control signal is at low "L" level, the memory control circuit 17 carries out the field processing. When on the other hand this dynamic control signal is at high "H" level, the memory control circuit 17 carries out the frame processing.

When the dynamic control mode is selected by the switch 43 after the operator has depressed the button disposed on the control panel (not shown) of the video signal processing apparatus, if the dynamic control signal of low "L" level is supplied to the memory control circuit 17 from the scene change detecting and motion detecting circuit 16, then the switch 42 selects the field processing unit 41.

At that time, the memory control circuit 17 controls the memory 11 on the basis of the program reference signal supplied thereto from the program reference generator 18 such that image data is processed at the field unit.

When the dynamic control mode is selected, if the dynamic control signal of high "H" level is supplied to the memory control circuit 17 from the scene change detecting and motion detecting circuit 16, the switch 42 selects the frame processing unit 40.

At that time, the memory control circuit 17 controls the memory 11 based on the program reference signal supplied thereto from the program reference generator 18 such that image data is processed at the frame unit.

When the operator depresses a button of the control panel (not shown) of the video signal processing apparatus to cause the switch 43 to select the dynamic control mode, if the operator further depresses a button of the control panel (not shown) of the video signal processing apparatus to cause the static control signal of low "L" level indicating the field processing to be supplied to the switch 42, then the switch 42 selects the field processing unit 41.

At that time, the memory control circuit 17 controls the memory 11 based on the program reference signal supplied thereto from the program reference generator 18 such that image data is processed at the field unit. The static control signal of low "L" level is the signal which enables the memory control circuit 17 to carry out the signal processing at the field unit.

When the operator depresses a button of the control panel (not shown) of the video signal processing apparatus to cause the switch 43 to select the static control mode, if the operator further depresses a button of the control panel (not shown) of the video signal processing apparatus to supply the static control signal of high "H" level indicating the frame processing to the switch 42, then the switch 42 selects the frame processing unit 40.

At that time, the memory control circuit 17 controls the memory 11 based on the program reference signal supplied thereto from the program reference generator 18 such that image data is processed at the frame unit. The static control signal of high "H" level is the signal which enables the memory control circuit 17 to carry out the signal processing at the frame unit.

According to this embodiment, the memory control circuit 17 serving as the image insertion and extraction control means includes the switching means 43 which switches the mode of the signal processing to the static mode in which image is inserted or extracted at the field or frame unit. Therefore, when a continuity between even field and odd field is regarded as very important, the static field processing can be carried out regardless of a motion of an image. Further, when a smoothness of a motion of an image is regarded as very important, a static frame processing can be carried out regardless of a motion of an image. Thus, the signal processing can be switched in accordance with the object of image in use and operator's preference.

According to the present invention, the motion detecting means generates the coincidence detection level on the basis of the energy ratio between the DC component and the AC component generated by the discrete cosine transform means and detects by comparing the difference between the DC component of the first field or frame and the DC component of the second field or frame continuing the first field or frame of the image with the coincidence detection level whether or not the image data indicates a still picture. Further, the image inserting and extracting means inserts or extracts image at the field unit when the motion detecting means detects that image data indicates a moving picture and inserts or extracts image data at the frame unit when the motion detecting means detects that image data indicates a still picture. Therefore, in the case of an image whose motion is easy to be recognized visually, if even a very small motion is detected from such image, such image is judged as a moving picture and image is inserted or extracted at the field unit to thereby prevent a motion of an image from becoming unnatural due to insertion and extraction of image. Further, in the case of an image whose motion is difficult to be recognized visually, if such image has a certain amount of motion, such image is judged as a still picture and image is inserted or extracted at the frame unit to thereby keep a continuity between odd field and even field as much as possible. Therefore, the processing for inserting and extracting image at the field unit and the processing for inserting and extracting image at the frame unit can be switched most suitably in response to a motion of an image. Thus, it is possible to improve a quality of a reproduced picture.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video signal processing apparatus comprising:

discrete cosine transform means for generating a DC component and an AC component by processing image data in a discrete cosine transform fashion;

motion detecting means for generating a coincidence detection level based on an energy ratio between said DC component and said AC component generated by said discrete cosine transform means, comparing a difference between a DC component of a first field or frame and a DC component of a second field or frame continuing said first field or frame of said image data with said coincidence detection level and detecting on the basis of a compared result whether said image data indicates a moving picture or a still picture; and image inserting and extracting means for inserting an image into or extracting an image from image data at field or frame unit based on a detected result of said motion detecting means, wherein said image inserting and extracting means inserts the image into or extracts the image from image data at the field unit when the indication provided by said image data as detected by said motion detecting means is indicative of moving picture and inserts the image into or extracts the image from image data at the frame unit when indication provided by said image data as detected by the said motion detecting means is indicative of said still picture.

2. A video signal processing apparatus according to claim 1, wherein said discrete cosine transform means performs a discrete cosine transform at every block of a plurality of blocks constructing a field or frame of said image data and said motion detecting means includes means for comparing a difference between each DC component of blocks constructing said first field or frame and each corresponding DC component of blocks constructing said second field or frame and said coincidence detection level and accumulating means for accumulating the number of blocks in which each said difference is smaller than said coincidence detection level, said motion detecting means detects that said image data is indicative of said still picture when a value accumulated by said accumulating means for one field or frame is larger than a predetermined value and detects that said image data is indicative of said moving picture when said accumulated value is smaller than said predetermined value.

3. A video signal processing apparatus according to claim 2, wherein said motion detecting means detects that said image data indicates a scene change when said accumulated value is smaller than a second predetermined value smaller than said predetermined value.

4. A video signal processing apparatus according to claim 1, wherein said motion detecting means detects said coincidence detection level based on the number of bits assigned to said DC component.

5. A video signal processing apparatus according to claim 1, wherein said image inserting and extracting means includes switching means for switching a mode in which said image is inserted into or extracted from said image data at the field or frame unit to a fixed mode in which said image is inserted into or extracted from said image data at either field or frame unit regardless of the detected result of said motion detecting means.

* * * * *